United States Patent
Brasseur (10) Patent No.: US 7,621,071 B2
(45) Date of Patent: Nov. 24, 2009

(54) SNAG-RESISTANT LINKABLE SINKER

(76) Inventor: Bernard P. Brasseur, 168 Center Rd., Cornish, NH (US) 03745

( * ) Notice: Subject to any disclaimer, the term of this patent is extended or adjusted under 35 U.S.C. 154(b) by 81 days.

(21) Appl. No.: 11/828,417

(22) Filed: Jul. 26, 2007

(65) Prior Publication Data

US 2008/0250694 A1  Oct. 16, 2008

Related U.S. Application Data (60) Provisional application No. 60/911,128, filed on Apr. 11, 2007.

(51) Int. Cl.
  *A01K 95/00* (2006.01)
  *A01K 95/02* (2006.01)
(52) U.S. Cl. .............. 43/44.97; 43/43.14; 43/43.1; 43/44.87
(58) Field of Classification Search ............... 43/43.14, 43/42.22, 42.09, 42.15, 42.19, 42.36, 44.97, 43/43.1, 43.15, 44.9, 44.91, 44.87
See application file for complete search history.

(56) References Cited

U.S. PATENT DOCUMENTS

| | | | | |
|---|---|---|---|---|
| 77,774 | A * | 5/1868 | Smith | 43/43.14 |
| 264,881 | A * | 9/1882 | Johnston | 43/43.14 |
| 273,238 | A * | 2/1883 | Johnston | 43/43.14 |
| 279,206 | A * | 6/1883 | Van Altena | 43/43.15 |
| 326,073 | A * | 9/1885 | Vosburgh | 43/43.14 |
| 342,181 | A * | 5/1886 | Carter et al. | 43/43.14 |
| 402,231 | A * | 4/1889 | Coles et al. | 43/43.14 |
| 501,346 | A * | 7/1893 | Homan | 43/43.14 |
| 549,332 | A * | 11/1895 | Sewell | 43/43.14 |
| 565,030 | A * | 8/1896 | Quinan | 43/43.14 |
| 575,674 | A * | 1/1897 | Woodward | 43/44.95 |
| 617,236 | A * | 1/1899 | Dougherty | 43/44.91 |
| 765,482 | A * | 7/1904 | Hardy | 43/42.09 |
| 883,048 | A * | 3/1908 | Pflueger | 43/43.1 |

(Continued)

FOREIGN PATENT DOCUMENTS

DE  4318191 A1 * 12/1994

(Continued)

OTHER PUBLICATIONS

Photograph of "snake sinker" discussed in Background section of application.

*Primary Examiner*—Darren W Ark
(74) *Attorney, Agent, or Firm*—Michael J. Weins; Jeffrey E. Semprebon (57) ABSTRACT

A linkable sinker which is particularly suitable for trolling can be used alone or linked end-to-end with similar sinkers. The sinker has an elongated weight with a weight passage and a wire member passing therethrough. The wire member terminates at a leading eye and a trailing eye; the eyes are spaced apart sufficiently that the wire member can be slid in the weight passage to remove a trailing eye leg from the weight passage to open the trailing eye, thereby allowing the leading eye of another sinker to be connected to form an articulated sinker. A resilient hood of compressible material is preferably provided, covering the leading eye. The resilient hood covers the space between adjacent weights when linked together. Preferably, the trailing eye is maintained in engagement with a trailing end of the weight to secure the leading eye of a subsequent sinker when connected to the trailing eye.

18 Claims, 4 Drawing Sheets

U.S. PATENT DOCUMENTS

| | | | | |
|---|---|---|---|---|
| 1,033,281 A * | 7/1912 | Skvor et al. | | 43/42.09 |
| 1,480,099 A * | 1/1924 | Murphy | | 43/43.14 |
| 1,500,463 A * | 7/1924 | Mattern | | 43/43.14 |
| 1,522,451 A * | 1/1925 | Hayes | | 43/42.19 |
| 1,546,701 A * | 7/1925 | Bailer | | 43/43.13 |
| 1,560,938 A * | 11/1925 | Lund | | 43/43.14 |
| 1,698,193 A * | 1/1929 | Geer | | 43/42.19 |
| 1,713,041 A * | 5/1929 | Fey | | 43/44.86 |
| 1,797,234 A * | 3/1931 | Jordan | | 43/42.15 |
| 1,858,550 A * | 5/1932 | Kahle | | 43/43.14 |
| 1,867,555 A * | 7/1932 | Hildebrandt | | 43/42.09 |
| 2,030,000 A * | 2/1936 | Harrington | | 43/43.14 |
| 2,121,279 A * | 6/1938 | Beck | | 43/43.14 |
| 2,157,003 A * | 5/1939 | Mussina | | 43/43.14 |
| 2,177,007 A * | 10/1939 | Smith | | 43/43.14 |
| 2,180,822 A * | 11/1939 | Gruenhagen | | 43/42.17 |
| 2,228,513 A * | 1/1941 | Frisbie | | 43/43.14 |
| 2,230,456 A * | 2/1941 | Henze | | 43/43.14 |
| 2,241,367 A * | 5/1941 | Sarff | | 43/43.15 |
| 2,292,743 A * | 8/1942 | Cordry | | 43/43.15 |
| 2,435,730 A * | 2/1948 | Worden | | 43/42.36 |
| 2,465,064 A * | 3/1949 | Colosimo | | 43/42.09 |
| 2,476,088 A * | 7/1949 | Gleason | | 43/43.14 |
| 2,482,648 A * | 9/1949 | Brandt | | 43/42.19 |
| 2,517,375 A * | 8/1950 | Anderson | | 43/43.14 |
| 2,519,104 A * | 8/1950 | Blomgren | | 43/44.97 |
| 2,552,248 A * | 5/1951 | Zavod | | 43/44.83 |
| 2,557,776 A * | 6/1951 | Anderson | | 43/43.14 |
| 2,584,356 A * | 2/1952 | Larson | | 43/43.14 |
| 2,589,715 A * | 3/1952 | Lysikowski | | 43/43.14 |
| 2,591,558 A * | 4/1952 | Kramer | | 43/44.9 |
| 2,651,135 A * | 9/1953 | Greenleaf | | 43/43.14 |
| 2,674,823 A * | 4/1954 | Gellings | | 43/42.36 |
| 2,727,332 A | 12/1955 | Benson | | |
| 2,729,014 A * | 1/1956 | Johnson | | 43/43.14 |
| 2,741,057 A * | 4/1956 | Morris et al. | | 43/42.09 |
| 2,749,650 A * | 6/1956 | Rees | | 43/43.12 |
| 2,750,701 A * | 6/1956 | Beames | | 43/42.09 |
| 2,750,702 A * | 6/1956 | Hartig | | 43/42.36 |
| 2,753,650 A * | 7/1956 | Rentz et al. | | 43/42.36 |
| 2,770,909 A * | 11/1956 | Illgner | | 43/43.14 |
| 2,784,515 A * | 3/1957 | Mcbride et al. | | 43/44.91 |
| 2,787,078 A * | 4/1957 | Aliber | | 43/43.14 |
| 2,795,075 A * | 6/1957 | Clarence | | 43/42.22 |
| 2,796,695 A * | 6/1957 | Meulnart | | 43/42.19 |
| 2,802,294 A * | 8/1957 | Litwin | | 43/42.22 |
| 2,829,462 A * | 4/1958 | Stokes | | 43/42.36 |
| 2,862,325 A * | 12/1958 | Magnus | | 43/42.22 |
| 2,863,253 A * | 12/1958 | Hettinger | | 43/43.14 |
| 2,880,547 A * | 4/1959 | Mills | | 43/44.87 |
| 2,940,204 A * | 6/1960 | Mehnert | | 43/42.09 |
| 2,986,839 A * | 6/1961 | Crimble | | 43/43.14 |
| 3,030,726 A * | 4/1962 | Knapton | | 43/43.15 |
| 3,035,368 A * | 5/1962 | Collins | | 43/42.09 |
| 3,041,695 A * | 7/1962 | Ouellette | | 43/44.83 |
| 3,043,044 A * | 7/1962 | Metzler | | 43/44.87 |
| 3,046,690 A * | 7/1962 | Woodley | | 43/42.09 |
| 3,077,049 A * | 2/1963 | Ward | | 43/44.9 |
| 3,139,695 A * | 7/1964 | Makowski | | 43/42.36 |
| 3,140,520 A * | 7/1964 | Marino et al. | | 43/43.15 |
| 3,148,423 A * | 9/1964 | Anspach | | 43/44.87 |
| 3,151,414 A * | 10/1964 | Hoerner | | 43/44.97 |
| 3,180,052 A * | 4/1965 | Malesko | | 43/43.14 |
| 3,184,879 A * | 5/1965 | Ruhl | | 43/43.14 |
| 3,220,139 A * | 11/1965 | Bessler | | 43/42.09 |
| 3,318,037 A * | 5/1967 | Harrison et al. | | 43/43.14 |
| 3,335,516 A * | 8/1967 | Sutton et al. | | 43/43.14 |
| 3,359,674 A * | 12/1967 | Strumor | | 43/43.14 |
| 3,417,503 A * | 12/1968 | Meulnart | | 43/42.36 |
| 3,461,597 A * | 8/1969 | Hobson | | 43/43.14 |
| 3,643,370 A * | 2/1972 | Cook et al. | | 43/43.14 |
| 3,648,398 A * | 3/1972 | Newell | | 43/43.14 |
| 3,667,151 A * | 6/1972 | Lamb | | 43/44.97 |
| 3,670,447 A * | 6/1972 | Wohead | | 43/43.14 |
| 3,672,088 A | 6/1972 | Sells | | |
| 3,771,252 A * | 11/1973 | Odenwald | | 43/44.97 |
| 3,824,732 A * | 7/1974 | Boone | | 43/42.19 |
| 3,834,061 A * | 9/1974 | Klein | | 43/44.9 |
| 3,857,645 A * | 12/1974 | Klein | | 43/44.9 |
| 3,888,036 A * | 6/1975 | Wallace | | 43/44.97 |
| 3,943,654 A * | 3/1976 | Shine | | 43/43.14 |
| 3,947,989 A * | 4/1976 | Bart | | 43/42.22 |
| 4,040,199 A * | 8/1977 | Raptis | | 43/43.14 |
| 4,090,317 A * | 5/1978 | Skwirut | | 43/42.36 |
| 4,110,930 A * | 9/1978 | Daniels | | 43/42.14 |
| 4,117,619 A * | 10/1978 | Stevenson | | 43/43.14 |
| 4,121,366 A * | 10/1978 | McClellan | | 43/42.09 |
| 4,125,958 A * | 11/1978 | Cote | | 43/43.12 |
| 4,229,899 A * | 10/1980 | McGahee | | 43/42.22 |
| 4,389,805 A * | 6/1983 | Hargrave | | 43/43.14 |
| 4,447,981 A * | 5/1984 | Bauer | | 43/42.36 |
| 4,649,662 A * | 3/1987 | Tharp et al. | | 43/43.14 |
| 4,679,349 A * | 7/1987 | Birchfield | | 43/44.97 |
| 4,693,030 A | 9/1987 | Wohead | | |
| 4,837,966 A * | 6/1989 | Bethel | | 43/44.97 |
| 4,941,279 A * | 7/1990 | Swanson | | 43/42.22 |
| 5,076,005 A * | 12/1991 | Rosek | | 43/42.19 |
| 5,233,786 A * | 8/1993 | Biss | | 43/43.14 |
| 5,369,906 A * | 12/1994 | Anterni | | 43/42.09 |
| 5,450,689 A | 9/1995 | Glick | | |
| 5,461,821 A | 10/1995 | Carter, Jr. | | |
| 5,555,668 A | 9/1996 | Brasseur | | |
| 5,595,015 A * | 1/1997 | Jensen | | 43/42.19 |
| 5,647,103 A * | 7/1997 | Foster | | 24/618 |
| 5,661,923 A * | 9/1997 | Fellowes | | 43/43.14 |
| 6,145,240 A | 11/2000 | Adams et al. | | |
| 6,176,036 B1 * | 1/2001 | Pease | | 43/44.9 |
| 6,305,121 B1 | 10/2001 | Adams et al. | | |
| 6,467,214 B1 * | 10/2002 | DeFrisco | | 43/43.14 |
| 6,484,435 B1 * | 11/2002 | Mosher | | 43/43.14 |
| 6,557,293 B2 * | 5/2003 | Klapka | | 43/42.06 |
| 6,557,294 B2 | 5/2003 | Adams et al. | | |
| 6,691,450 B2 | 2/2004 | Glavinich | | |
| 6,745,511 B1 * | 6/2004 | Falconer | | 43/44.87 |
| 6,843,018 B2 | 1/2005 | Adams et al. | | |
| 6,874,272 B1 | 4/2005 | Adams et al. | | |
| 6,910,296 B2 * | 6/2005 | Blette et al. | | 43/43.1 |
| 7,469,497 B2 * | 12/2008 | Hergott | | 43/42.15 |
| 2002/0088166 A1 * | 7/2002 | Halsne | | 43/44.9 |
| 2003/0159332 A1 | 8/2003 | Crochet | | |
| 2003/0163945 A1 * | 9/2003 | Okada | | 43/42.36 |
| 2004/0134119 A1 | 7/2004 | Glavinich et al. | | |
| 2004/0231225 A1 * | 11/2004 | Okada | | 43/42.36 |
| 2005/0039376 A1 * | 2/2005 | Blette et al. | | 43/43.1 |
| 2005/0044770 A1 * | 3/2005 | Linklater | | 43/42.19 |
| 2007/0199233 A1 * | 8/2007 | Higgin | | 43/42.09 |
| 2008/0066368 A1 * | 3/2008 | Ciotlos | | 43/42.09 |

FOREIGN PATENT DOCUMENTS

| | | | |
|---|---|---|---|
| EP | 46089 A1 * | 2/1982 | |
| EP | 882396 A1 * | 12/1998 | |
| GB | 2078472 A * | 1/1982 | |
| GB | 2087202 A * | 5/1982 | |
| GB | 2166631 A * | 5/1986 | |
| GB | 2171282 A * | 8/1986 | |
| GB | 2182531 A * | 5/1987 | |
| GB | 2199471 A * | 7/1988 | |
| GB | 2200022 A * | 7/1988 | |
| GB | 2204771 A * | 11/1988 | |
| GB | 2325135 A * | 11/1998 | |
| GB | 2345425 A * | 7/2000 | |
| GB | 2357686 A * | 7/2001 | |
| GB | 2373982 A * | 10/2002 | |

| | | | | | | | | | |
|---|---|---|---|---|---|---|---|---|---|
| GB | 2394878 | A | * | 5/2004 | JP | 2004305108 | A | * | 11/2004 |
| JP | 09322680 | A | * | 12/1997 | JP | 2005058001 | A | * | 3/2005 |
| JP | 11018649 | A | * | 1/1999 | JP | 2005328701 | A | * | 12/2005 |
| JP | 11289921 | A | * | 10/1999 | JP | 2006087320 | A | * | 4/2006 |
| JP | 2000050775 | A | * | 2/2000 | JP | 2006325439 | A | * | 12/2006 |
| JP | 2000060387 | A | * | 2/2000 | JP | 2006325468 | A | * | 12/2006 |
| JP | 2000078943 | A | * | 3/2000 | JP | 2007116943 | A | * | 5/2007 |
| JP | 2000175605 | A | * | 6/2000 | JP | 2007135556 | A | * | 6/2007 |
| JP | 2000253788 | A | * | 9/2000 | JP | 2007189967 | A | * | 8/2007 |
| JP | 2000287596 | A | * | 10/2000 | JP | 2007209313 | A | * | 8/2007 |
| JP | 2000295953 | A | * | 10/2000 | JP | 2007222082 | A | * | 9/2007 |
| JP | 2000342114 | A | * | 12/2000 | JP | 2007222147 | A | * | 9/2007 |
| JP | 2002315485 | A | * | 10/2002 | JP | 2008017720 | A | * | 1/2008 |
| JP | 2002315486 | A | * | 10/2002 | JP | 2008061637 | A | * | 3/2008 |
| JP | 2002360139 | A | * | 12/2002 | JP | 2008188005 | A | * | 8/2008 |
| JP | 2003061514 | A | * | 3/2003 | JP | 2008271936 | A | * | 11/2008 |
| JP | 2003061533 | A | * | 3/2003 | WO | WO 2004071187 | A1 | * | 8/2004 |
| JP | 2003125685 | A | * | 5/2003 | | | | | |

* cited by examiner

SNAG-RESISTANT LINKABLE SINKER

FIELD OF THE INVENTION

The present invention relates to sinkers employed to hold a fishing line near the bottom of a body of water, and more particularly to a sinker which greatly reduces the tendency to snag or become entangled by obstructions or weeds, and which is well suited for use in a variety of water conditions so as to be particularly well suited for use when trolling.

BACKGROUND OF THE INVENTION

For many fishing situations, one or more sinkers are employed to maintain a lure or bait in close proximity to the bottom of a body of water. These sinkers are prone to snagging on weeds, rocks, submerged branches, and similar obstacles as the fishing line to which they are connected is moved through the water, especially when trolling. Such snagging may result in breakage of the fishing line and loss of the sinker(s) and possibly the lure or bait attached thereto.

To prevent snagging of the lure or bait, U.S. Pat. No. 5,555,668 of the present inventor teaches a bait locating device that employs a flotation member to float a fishing line and the lure or bait attached thereto off the bottom, allowing the lure or bait to pass over most obstructions. The bait locating device of the '668 patent also prevents loss of the lure or bait in the event that the sinker becomes snagged, since the sinker is attached via a sinker line selected to be weaker than the fishing line, so that the sinker line can be broken to allow recovery of the fishing line and any expensive lure attached thereto when the sinker becomes snagged.

Other patents which teach sinkers that can break away to allow recovery of the lure or bait are taught in U.S. Publication 2004/0134119, which teaches a weight attached to the line by a wire which bends to allow the line to break away, while U.S. Pat. Nos. 3,648,398 and 5,461,821 teach sinkers that have a weight held in a resilient tube, where the weight is intended to be squeezed out of the tube if it becomes trapped. While these patents may allow recovery of the lure or bait and ready replacement of a sinker weight which becomes snagged, they will still result in loss of the weights when used in areas with a large number of obstructions.

To avoid the problem of snagging of the sinker itself, sinkers have traditionally been formed as metal weights having streamlined shapes in an attempt to reduce sharp edges liable to catch on obstructions. However, such sinkers can still become lodged between rocks or fall into crevices and become snagged. Another sinker which has been found liable to snagging in rocks is a "snake sinker", which is formed from a length of flexible braided fabric tube with a number of ball bearings inserted into the tube and the ends closed to form a flexible, elongated weight. In one embodiment, the tubing is closed at each end by crimping a metal cap onto the fabric tube, the cap also serving to attach a swivel eye for connecting the "snake sinker" to the line. The fabric tube of these sinkers has been found susceptible to wear when the sinkers are used in rocky areas. In addition to their tendency to snag and suffer damage due to abrasion when used in rocky locations, the "snake sinkers" are relatively expensive, particularly in situations where a greater weight is desired and multiple "snake sinkers" must be connected together to obtain the desired weight.

One approach to reducing snagging is to provide an elongated sinker with a buoyant portion which is intended to cause the sinker to assume an upright position in the water, such as taught in U.S. Pat. Nos. 3,670,447 and 3,672,088. These patents teach that the upright position should allow the sinker to pass over obstructions without snagging and to lift out of crevices when retrieved. The incorporation of a buoyant portion will tend to reduce the overall effectiveness of the sinker. Additionally, these elongated sinkers would not appear to have sufficient buoyancy to maintain their upright position when being retrieved through the water, which may limit their practical applications. Although the '447 patent states that the upright position allows the sinker to be pulled out of crevices, the same inventor later found it advantageous to provide the basic structure with an array of wire legs to prevent the resulting sinker from falling into crevices and becoming snagged or jammed therein, as taught in U.S. Pat. No. 4,693,030. While the wire legs of the '030 patent may provide a benefit in rocky environments, they would appear to increase the risk of snagging when employed in areas with weeds and/or branches, and may increase the risk of entanglement with the lure or bait when casting. The resulting sinker also does not appear to be capable of being stored compactly.

U.S. Pat. Nos. 6,145,240; 6,305,121; 6,557,294; 6,843,018; and 6,874,272, teach elongated sinkers which again have a buoyant portion, but which also have a curved body rather than the straight bodies of the partially buoyant sinkers discussed above. The combination of the buoyant portion and the curved body is intended to allow the sinker to slide over and/or maneuver its way past obstructions rather than snagging. Again, the reduction in overall effective weight due to the buoyant portion may limit the useful applications of the sinker. The limitations of these sinkers are discussed in the Background section of U.S. Publication 2003/0159332, which teaches an elongated sinker having a bent body without any buoyant portion. The bent portion of this sinker is intended to cause the sinker to provide a twisting motion upon contact with obstacles to prevent snagging. However, the weight may still be prone to snagging in situations where there is insufficient space to accommodate the twisting motion, and may be prone to entanglement in weeds. U.S. Pat. No. 5,450,689 teaches another sinker without a buoyant portion, this one having a curved body.

Another approach that has been tried is to form the sinker with at least a portion which is resiliently flexible, as taught in U.S. Pat. Nos. 2,727,332 and 4,679,349. These patents teach that having such a resilient portion allows the user to forcefully flex the sinker by jerking the sinker line when the sinker becomes snagged, this action causing the sinker to spring free of the obstacle. This flexing action requires attaching the line in such a manner as to slidably engage the leading end of the sinker and tying to the trailing end, complicating the attachment of the sinker and possibly increasing the risk of snagging or engtangling the sinker line. This action may increase the susceptibility of the line to chafing. While the flexing action of these sinkers may be beneficial in the event that the sinker becomes lodged between rocks or submerged branches, it would not appear to provide any benefit to reduce the possibility of entanglement in weeds or other obstructions which are not rigid, and which can move to accommodate the flexing action of the sinker.

Because the sinkers discussed above rely on the configuration of the sinker for reducing the tendency to snag, they may limit the ability of the user to change the weight of the sinker to suit conditions such as current, boat speed when trolling, etc. To change the sinker weight, the sinker on the line must be replaced with one of a different weight, which requires an inventory of sinkers of different weights. When sinkers having a complex configuration are employed, the high cost of each individual sinker may limit the inventory that the user can afford. The problem of limited weight selection may be a particular problem for those sinkers which employ a buoyant portion, since they are complicated in structure and the effective weight of the resulting sinker is reduced by the buoyant portion.

The '398 and '821 patents discussed above do allow the weight of the sinker to be readily changed, by pulling the weight from the tubing and substituting a different weight. However, these devices appear to be limited in the amount of weight that can be employed in the sinker, since a relatively large weight would require the weight to be excessively long, and this long, rigid weight may be more prone to snagging. Also, an excessively long weight is difficult to store conveniently. It also appears that there may be problems attaining the right degree of friction between the weight and the tubing such that the weight will not fall out of the tubing when casting, but will slip out of the tubing if it becomes jammed.

None of the above sinkers appear to provide both resistance to becoming jammed in rocks, crevices, and branches and resistance to becoming entangled in weeds. This limited utility is a particular disadvantage when trolling, since the sinker line may be moved through regions of water having different conditions, such as from a rocky area into an area with numerous weeds.

SUMMARY OF THE INVENTION

The present invention provides a snag-resistant linkable sinker which can be used alone or linked end-to-end with similar sinkers to form an articulated sinker having the desired weight, and which resists snagging under a wide range of water conditions. The sinker is attached to a line, hereinafter referred to as a sinker line, and serves to maintain a fishing lure or bait in the vicinity of the bottom of a body of water. The sinker is well suited for use with a bait locating device such as taught in U.S. Pat. No. 5,555,668 of the present inventor, which is incorporated herein by reference.

The linkable sinker has an elongated weight and a wire member passing therethrough. The weight has a weight length $L_W$ and terminates in a weight leading end and a weight trailing end. As used herein, the terms "leading" and "trailing" are defined according to the motion of the linkable sinker when the sinker line is pulled through water, either to troll or to retrieve the linkable sinker and any lure or bait connected thereto. The weight is preferably cylindrical in cross section, and it is preferred for the weight leading end to be tapered to enhance its resistance to snagging. The weight has a longitudinal weight passage therethrough.

The wire member has a shank portion that passes through the weight passage of the weight, and terminates at a leading eye and a trailing eye. The leading eye and the trailing eye are sized so as to be blocked from passing into the weight passage. The leading eye is preferably a closed eye, to which the sinker line can be tied or attached via a snap or similar connector.

The trailing eye is formed by an open-ended loop and is spaced apart from the leading eye by an eye separation S. The trailing eye has a trailing eye leg that can be positioned to extend alongside the shank portion of the wire member. When the trailing eye leg is so positioned, it can be inserted into the weight passage to close the trailing eye. The trailing eye leg has a trailing eye leg length $L_L$. To allow the trailing eye leg to be removed from the weight passage to open the trailing eye, the eye separation S is selected such that $S > L_W + L_L$. Thus, when the wire member is slidably moved in the weight passage to bring the leading eye against the weight leading end, the trailing eye leg is removed from the weight passage to allow access to the trailing eye.

The ability to access the trailing eye allows the leading eye of another, similar, linkable sinker to be connected to the trailing eye so as to form an articulated sinker of greater weight. Additional linkable sinkers can be chained together end-to-end in this manner to obtain a desired total weight, and the resulting articulated sinker will present a small cross section to obstructions to reduce snagging, but will still be able to flex to work its way around obstructions. Furthermore, the elongated nature of the linkable sinkers will allow the resulting articulated sinker to pass over small crevices and obstructions. These latter problems have not been fully addressed by earlier sinkers.

The snag-resistant qualities of the linkable sinker can be greatly enhanced when the sinker includes a resilient hood which attaches with respect to the weight leading end of the elongated weight and extends over the exposed portion of the shank portion of the wire member and covers the leading eye. The resilient hood has a hood passage extending therethrough, the hood passage being configured such that the leading eye of the wire can member movably reside therein. When the weight leading end is tapered, the resilient hood can be attached thereto by forcibly inserting the tapered weight leading end into the hood passage so as to become frictionally engaged therein.

The resilient hood is formed of a resilient, compressible material, and has a hood leading end and a hood trailing end separated by an uncompressed hood length $L_H$ selected such that $L_H + L_W > S$, to assure that the resilient hood can cover the leading eye when the hood trailing end engages the weight leading end of the weight. When the sinker line is tied to the leading eye, the resilient hood protects the line from chafing where it ties onto the leading eye. Additionally, the resilient hood provides a resilient leading surface for engaging hard objects such as rocks, and will tend to bounce the resulting sinker off of such objects to prevent the sinker from becoming jammed. When multiple linkable sinkers are chained together, the resilient hoods of the additional sinkers act to cover the space between adjacent weights. Preferably, the resilient hood has a hood leading end which is tapered to further reduce the likelihood of snagging.

Preferably, the trailing eye of the wire member is formed so as to have an access gap G when the trailing eye leg is removed from the weight passage, this access gap G being sized less than a wire diameter D of the wire from which the wire member is formed such that the leading eye of a subsequent linkable sinker will snap into the trailing eye and will be retained therein in the event that the trailing eye leg becomes withdrawn from the weight passage. It is further preferred that the trailing eye leg cross the shank portion of the wire member so as to form a spiral loop. When so formed, the trailing eye can have a smaller gap G and is provided with a coil spring-like action that will tend to retain the trailing eye leg in the weight passage.

Means for maintaining the trailing eye of the wire member engaged with the trailing end of the elongated weight are preferably provided, to further secure the leading eye of a subsequent sinker when connected to the trailing eye. These means can be provided by configuring the trailing eye such that it is elastically deformed when the trailing eye leg is positioned to reside alongside the shank portion of the wire member; this elastic deformation causes the trailing eye leg to forcibly engage the weight passage when inserted therein. If the weight is formed of a soft alloy such as a lead alloy, it is preferred that a sleeve of an abrasion resistant material such as steel be provided in the region of the weight passage where contact with the trailing eye leg will occur. The incorporation of a coil spring into the weight adjacent to the weight trailing end has been found effective in providing such a sleeve.

An alternative and frequently preferred means for maintaining the trailing eye engaged with the weight trailing end can be provided by interaction of the resilient hood with the leading eye. In one preferred scheme, the leading eye is fastened to the sinker line by a snap that is sized too large to enter the hood passage, thereby compressing the resilient hood against the weight leading end. In this case, the compression of the resilient hood causes the resilient hood to act as a compression spring that forces the snap and the leading eye attached thereto forward, away from the weight leading end; this, in turn, forces the trailing eye into engagement with the weight trailing end. In another scheme, the hood passage is configured with a forward-facing ledge that forcibly engages the leading eye such that the leading eye compresses a trailing portion of the resilient hood.

BRIEF DESCRIPTION OF THE FIGURES

FIG. 6 is a partially exploded view of linkable sinker which forms another embodiment of the present invention. The wire member of this embodiment is formed with a trailing eye which, rather than being a planar "C"-shaped structure, is a spiral that provides a coil spring-like trailing eye which permits smaller gaps to be employed, as well as requiring a twisting action to disengage, thus providing a more secure coupling when engaged with a closed leading eye of another linkable sinker. The spring-like action also allows the trailing eye leg to be elastically positioned for insertion into the weight passage and, when so inserted, the trailing eye leg will forcibly engage the weight passage so as to maintain the trailing eye engaged with the weight trailing end. The weight passage is partly formed by a sleeve to resist abrasion by the trailing eye leg. This embodiment also differs in that it employs a resilient hood having cutouts that allow the resilient hood to be formed of a relatively durable material while still being readily compressible.

DETAILED DESCRIPTION OF THE PREFERRED EMBODIMENTS

FIGS. 1-5 illustrate a linkable sinker 10 that forms one embodiment of the present invention, which allows a user to link together a desired number of linkable sinkers end-to-end to obtain a desired weight without increasing the cross-section of the resulting combination. The linkable sinker 10 has an elongated weight 12, typically formed as a cylinder, and a wire member 14. The elongated weight 12 has a weight length $L_W$ (shown in FIG. 2) and terminates in a weight leading end 16 and a weight trailing end 18. The weight leading end 16 is preferably tapered. The weight 12 has a weight passage 20 extending longitudinally therethrough.

Figure 3:
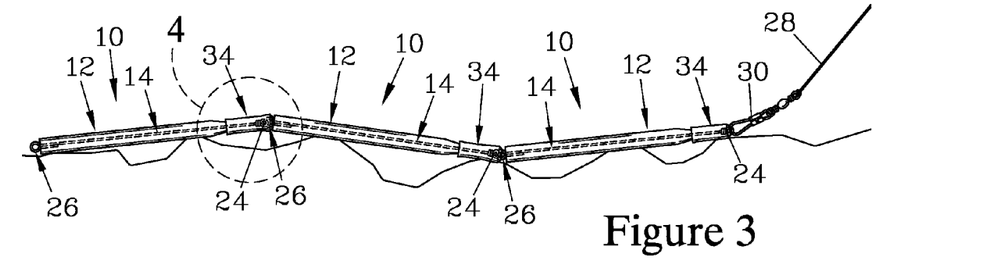
FIG. 3 is a view showing the linkable sinker shown in FIGS. 1 and 2, as well as two additional linkable sinkers which have been connected end-to-end in a chain to the first linkable sinker. When chained together, the resilient hoods of the two additional linkable sinkers cover the regions between the elongated weights, and the linkable sinkers form an articulated sinker for sliding over the bottom of a body of water.

The wire member 14 has a shank portion 22 that passes through the weight passage 20 and terminates at a leading eye 24 and a trailing eye 26. The weight passage 20 and the leading and trailing eyes (24, 26) are sized such that the eyes (24, 26) are too large to pass into the weight passage 20. The leading eye 24 is typically formed as a closed loop, to which a sinker line 28 (shown in FIG. 3) can be tied or attached via a snap 30, as shown in FIG. 3. Preferably, the wire member 14 is formed from a single length of wire stock.

Figure 1:
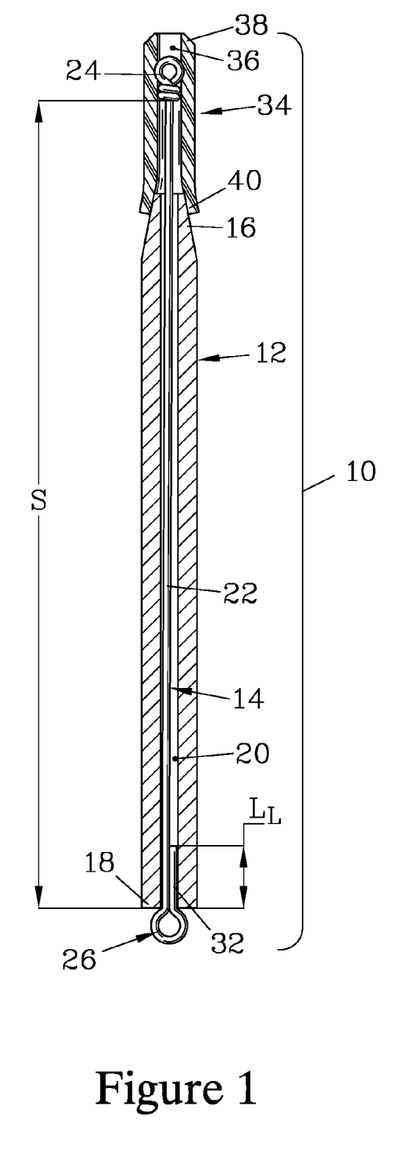
FIG. 1 is a section view of a linkable sinker that forms one embodiment of the present invention. The linkable sinker has an elongated weight with a wire member passing therethrough, which terminates in a closed leading eye and a trailing eye that can be opened. A resilient hood is provided, which covers the leading eye of the wire member when in service.

The trailing eye 26 is formed by an open-ended loop, which has a trailing eye leg 32 that can be positioned to extend alongside the shank portion 22. When so positioned, the trailing eye leg 32 can be inserted into the weight passage 20 as shown in FIG. 1 to close the trailing eye 26. The trailing eye 26 can be used to attach the leading eye 24 of a similar linkable sinker 10, which allows a user to link together a number of sinkers end-to-end as shown in FIG. 3 to obtain a desired weight without increasing the cross-section of the resulting combination.

Figure 2:
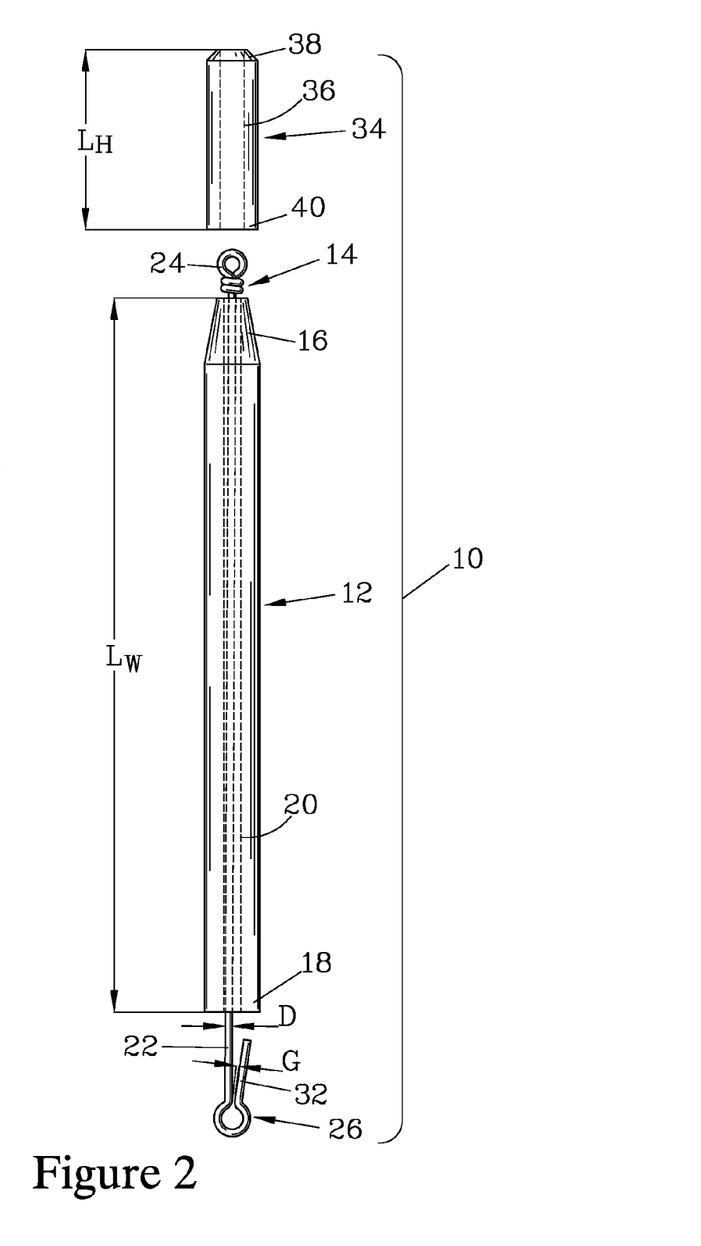
FIG. 2 is a partially exploded side view of the linkable sinker shown in FIG. 1, where the wire member has been slid in a weight passage of the weight such that the trailing eye is displaced from a weight trailing end of the weight to allow access to the trailing eye.

To attach another linkable sinker 10 to the trailing eye 26, the wire member 14 is slidably moved in the weight passage 20 to move the leading eye 24 towards the weight leading end 16, which in turn moves the trailing eye 26 away from the weight trailing end 18 such that the trailing eye leg 32 is removed from the weight passage 20, as shown in FIG. 2, thereby allowing access to the open loop of the trailing eye 26. The trailing eye leg 32 can be passed through the leading eye 24 of a similar linkable sinker 10 to connect the second linkable sinker 10 to the trailing eye 26, at which time the trailing eye 26 can be closed by sliding the trailing eye leg 32 into the weight passage 20, to the position shown in FIG. 1.

The trailing eye leg 32 extends a trailing eye leg length $L_L$, and the leading eye 24 and the trailing eye 26 are spaced apart by an eye separation S which is greater than the combined length of the weight length $L_W$ and the trailing eye leg length $L_L$ ($S>L_W+L_L$); this spacing assures that the trailing eye leg 32 can be removed from the weight passage 20 to allow access to the trailing eye 26.

Preferably, the trailing eye 26 is formed such that, when the loop is open, there is an access gap G that is smaller than a diameter D of the wire member 14, and hence smaller than the diameter of the wire forming the leading eye 24 of another linkable sinker 10. When the gap G is so sized, the leading eye 24 of the second linkable sinker 10 will snap into the loop of the trailing eye 26 so as to remain secured therein, even in the event that the trailing eye leg 32 is removed from the weight passage 20. The snapping retention of the leading eye can be enhanced by employing the trailing eye configuration shown in FIGS. 6 and 7 and discussed below.

The weight 12 is preferably formed of a relatively dense metal, two preferred examples being lead-based and tin-based alloys. The wire member 14 is preferably formed from stainless steel wire, and it has been found practical to use wire having the diameter D about 1/32".

The resistance of the linkable sinker 10 to snagging can be greatly enhanced by including a resilient hood 34 that attaches with respect to the weight leading end 16. The resilient hood 34 is formed of a durable, resilient material and having a hood passage 36 that is positioned over the leading eye 24 and the part of the shank portion 22 that extends beyond the weight leading end 16 of the weight 12. The hood passage 36 is configured such that the leading eye 24 can movably reside therein. Preferably, the hood passage 36 is configured such that it can be forced over the tapered weight leading end 16 so as to become frictionally attached thereto. It is also preferred for the hood passage 36 to frictionally engage the leading eye 24 when it is inserted therein; however, the leading eye 24 should still be readily movable so that the user can extend the leading eye 24 beyond the hood passage 36 when the resilient hood 34 is compressed, as discussed in greater detail below.

The resilient hood 34 has a hood leading end 38 and a hood trailing end 40 that are separated by an uncompressed hood length $L_H$. To assure that the resilient hood 34 can extend over the leading eye 24 when in use, the hood length $L_H$ is selected such that $L_H+L_W>S$. The resilient hood 34 acts to shield the leading eye 24 from snagging on obstructions, and may prevent chafing of the sinker line 28 when it is tied to the leading eye 24. It is also felt that, since the resilient hood 34 forms the leading portion of the linkable sinker 10, it will tend to compress and then rebound upon contacting an obstruction, thereby bouncing the linkable sinker 10 away from the obstruction to avoid snagging. To provide further resistance to snagging, it is preferred for the hood leading end 38 to be tapered.

Figures 4, 5:
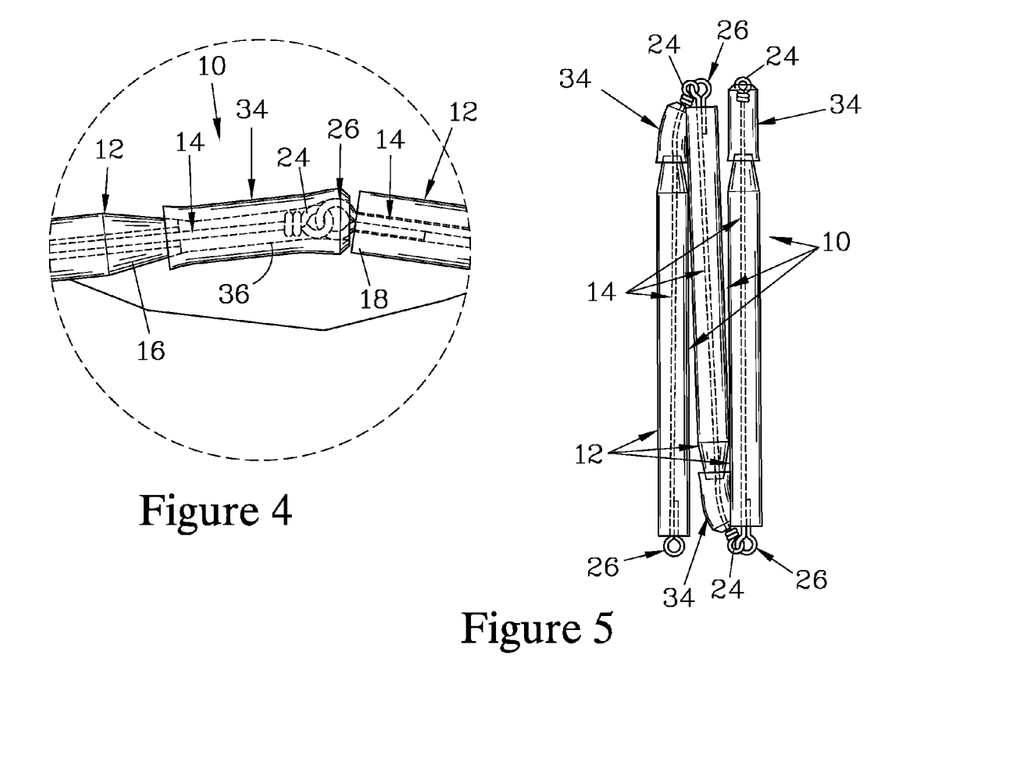
FIG. 4 is a detail view of the region 4 of FIG. 3, better illustrating the connection between adjacent linkable sinkers, where the leading eye of one linkable sinker is linked to the trailing eye of another.
FIG. 5 is a view of the linkable sinkers shown in FIG. 3, where the linkable sinkers remain connected together but are folded so as to reside side-by-side for compact storage.

The resilient hood 34 can be longitudinally compressed against the leading end 16 of the weight 12; this can be done while retaining the wire member 14 in position with the trailing eye 26 against the weight trailing end 18, or while moving the wire member 14 so as to move the leading eye 24 toward the weight leading end 16 and moving the trailing eye 26 away from the weight trailing end 18. In the first case, when the resilient hood 34 is compressed while the trailing eye 26 remains substantially against the weight trailing end 18, the leading eye 24 extends from the hood passage 36, to allow attaching a fastener thereto or to tie the sinker line 28 thereto. Examples of fasteners which might be attached to the leading eye 24 are snaps, such as the snap 30 shown in FIG. 3, or the trailing eye 26 of another linkable sinker 10, such as best shown in FIG. 4. In the second case, when the resilient hood 34 is compressed while pushing the leading eye 24 toward the weight leading end 16, the trailing eye 26 is moved away from the trailing end 18 until the trailing eye leg 32 is removed from the weight passage 20 (the position shown in FIG. 2), allowing access to the trailing eye 26.

Since the trailing eye 26 allows another, similar linkable sinker 10 to be attached, a desired total sinker weight can be achieved by attaching together a desired number of linkable sinkers 10 in series, as shown in FIG. 3. When attached in this manner, the joint where the leading eye 24 of one sinker hooks over the trailing eye 26 of another is covered by the resilient hood 34 that extends over the leading eye 24, as best shown in FIG. 4, and thus the joint is not exposed to obstructions. Because the linkable sinkers 10 are attached end-to-end, they present a reduced cross section that is less prone to snagging, providing a sinker which is particularly well suited for trolling. The resulting combination of linked, elongated weights 12 acts as an articulated sinker which tends to slide over or past obstructions and which is less susceptible to falling into crevices or between rocks. The resilient hoods 34 covering the joints fill the spaces between adjacent weights 12 to maintain a streamlined overall profile and to protect the joined eyes (24, 26) from becoming entangled in weeds or similar obstructions. This combined articulated sinker can be readily stored by compressing the resilient hoods 34 to allow folding at the joints between the linkable sinkers 10 to place the weights 12 in a roughly side-by-side relationship for compact storage, as shown in FIG. 5. For freshwater applications, it has been found practical to employ elongated weights 12 that each have a weight of 1 ounce or 1.5 ounces, these weight amounts being suitable for combination to obtain a desired weight suitable for trolling under most conditions.

Figure 6:
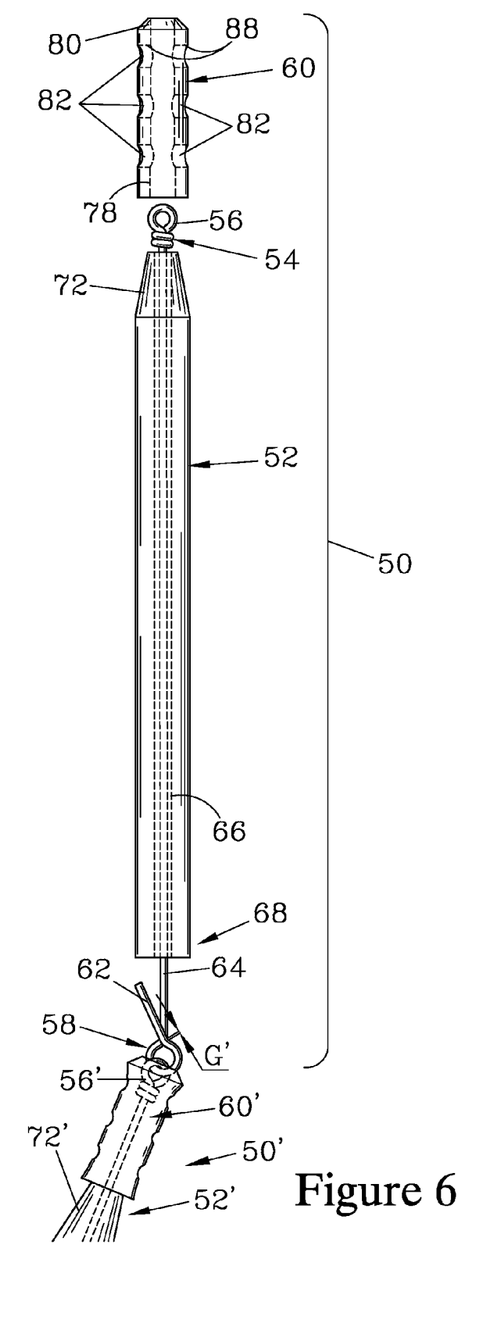
Figure 7:
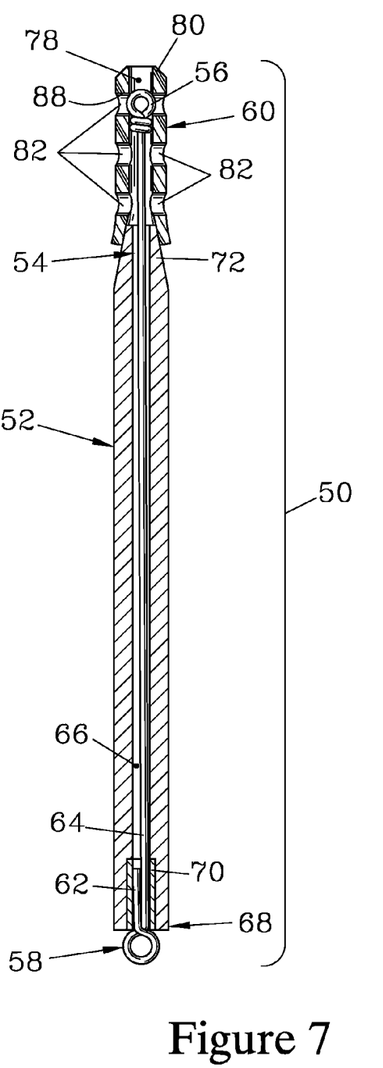
FIG. 7 is a section view of the linkable sinker shown in FIG. 6 when the trailing eye leg has been elastically positioned to reside alongside a shank portion of the wire member and has been inserted into the weight passage so as to forcibly engage the sleeve.

FIGS. 6 and 7 illustrate a linkable sinker 50 that again has an elongated weight 52, a wire member 54 terminating in a leading eye 56 and a trailing eye 58, and a resilient hood 60; in this embodiment, the trailing eye 58 is designed to provide a more positive retention of an eye attached thereto, such as a leading eye 56' of another, similar linkable sinker 50'. The trailing eye 58 of this embodiment is formed with a trailing eye leg 62 that crosses over a shank portion 64 of the wire member 54 so as to form a coil spring-like structure, as best shown in FIG. 6. This provides a gap G' defined between the trailing eye leg 62 and shank portion 64 that may be smaller than the gap G provided by the wire member 14 discussed above, to more positively retain the leading eye 56' snapped onto the trailing eye 58. This configuration also requires a twisting motion to thread the leading eye 56' onto the trailing eye 58, which should again improve retention.

In the trailing eye 58 shown, the trailing eye leg 62 has a rest position where it is substantially inclined with respect to the shank portion 64 of the wire member 54, as shown in FIG. 6. This inclination facilitates threading the leading eye 56' onto the trailing eye leg 62, and makes it easier for a user to pry the trailing eye 58 open to remove the leading eye 56' therefrom. This structure also requires the trailing eye leg 62 to be moved against the spring force of the trailing eye 58 in order to be positioned parallel to the shank portion 64 of the wire member 54 for insertion into a weight passage 66 of the weight 52.

When the weight 52 is formed of a relatively soft material, such as a lead-based alloy, it is preferred for the weight passage 66 to be reinforced in at least the region adjacent to a weight trailing end 68 to prevent damage from the trailing eye leg 62. Such reinforcement can be readily provided by embedding a cylindrical reinforcing sleeve 70, shown in FIG. 7, such as a piece of tubing or a coil spring into the weight trailing end 68. A coil spring formed from stainless steel wire has been found particularly effective. When the weight 52 is formed from a relatively hard material, such as some tin-based alloys, such reinforcement of the weight passage 66 is typically not needed.

When multiple linkable sinkers (50, 50') are to be connected together in the manner of the linkable sinkers 10 shown in FIG. 3, means for maintaining the trailing eye 58 engaged with the trailing end 68 of the weight 52 are preferably provided. These means serve to maintain the trailing eye 58 closed to prevent the leading eye 56' of the following linkable sinker 50' from becoming detached therefrom. These means also serve to hold the adjacent weights (52, 52') in close proximity so that the resilient hood 60' residing therebetween covers the region between a weight leading end 72' of the weight 52' and the weight trailing end 68 of the weight 50, thus reducing exposure to snagging on weeds and other obstructions. In the present embodiment, one means for maintaining the trailing eye 58 engaged with the weight trailing end 68 can be provided by the forcible engagement of the trailing eye leg 62 against the sleeve 70, this engagement providing resistance to sliding of the wire member 54 in the weight passage 66.

Figures 8, 9, 10, 11, 12:
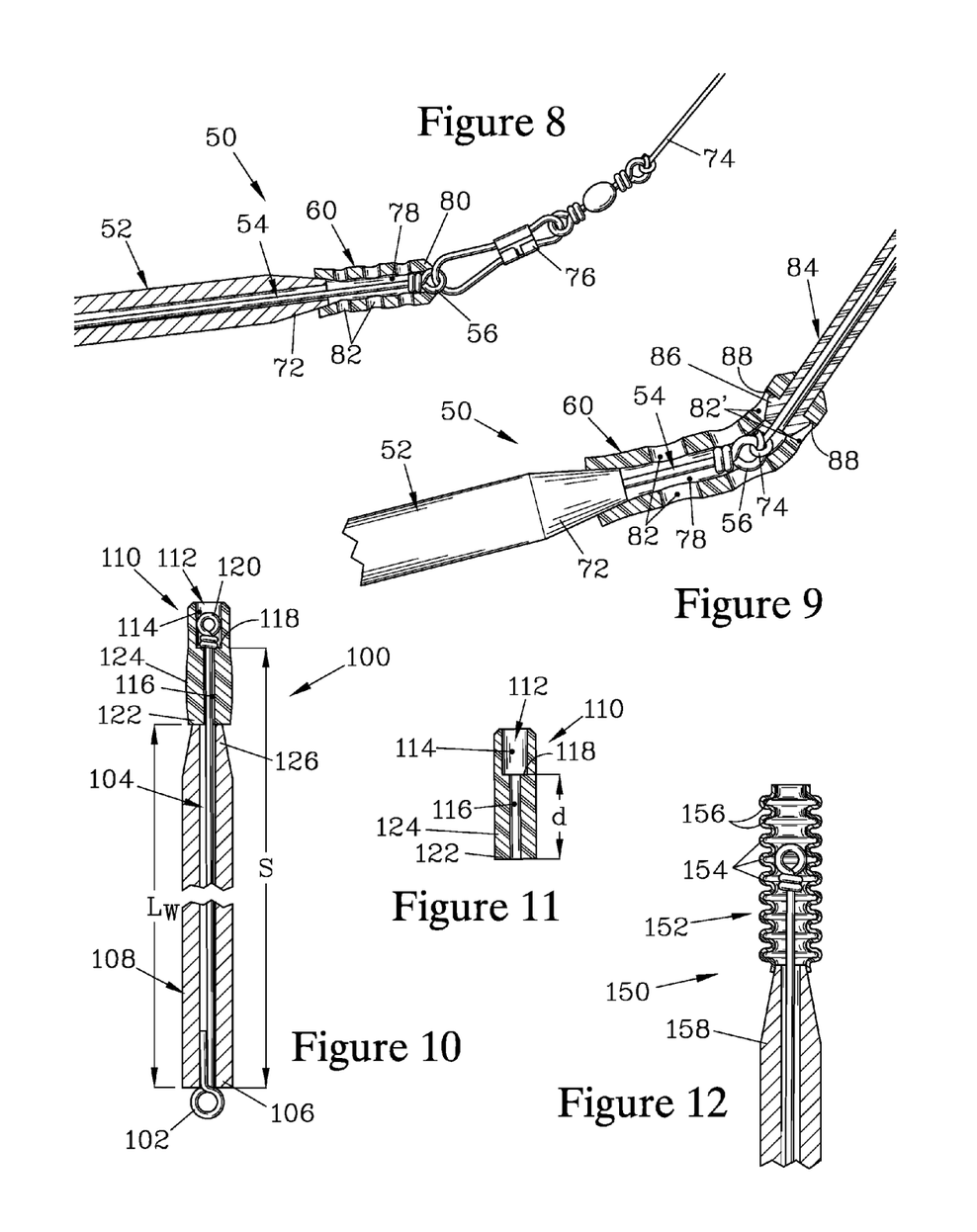
FIG. 8 is a partial view of the linkable sinker shown in FIGS. 6 and 7 showing a conventional snap swivel connected to the leading eye of the wire member. The resilient hood of this embodiment has a hood passage sized such that the snap is blocked from entering, and thus the snap creates a compressive load on the resilient hood; this compressive load biases the leading eye away from the elongated weight, which in turn biases the trailing eye into engagement with the trailing end of the elongated weight.
FIG. 9 is a partial view showing the linkable sinker shown in FIGS. 6 and 7 used in combination with a line shield, which is the subject matter of co-pending application Ser. No. 11/828,414 of the present inventor entitled "Snag-Resistant Sinker Line Shield". The line shield has a line shield hood which is attachable to the weight leading end of the sinker and serves as the resilient hood of the sinker as well as providing means for securing a tube with respect to the sinker. In this embodiment, the position of the trailing eye against the weight trailing end can be maintained by binding of the trailing eye leg in the weight passage.
FIG. 10 is a partial section view of a linkable sinker that forms another embodiment of the present invention, which employs a resilient hood having a forward-facing ledge sized to engage the leading eye of the wire member. The forward-facing ledge is positioned such that the engagement with the leading eye creates a compression load on a trailing portion of the resilient hood, which acts to bias the trailing eye of the wire member against the trailing end of the elongated weight.
FIG. 11 is a section view of the resilient hood shown in FIG. 10 when in an uncompressed state.
FIG. 12 is a partial section view of a linkable sinker that forms another embodiment of the present invention, which employs a resilient hood formed from a length of corrugated tubing. As with the embodiment shown in FIG. 9, the resilient hood could be formed by the resilient hood of a line shield.

Another means for maintaining the trailing eye 58 engaged with the trailing end 68 of the weight 52 can be provided by interaction of the resilient hood 60 with the leading eye 56. One approach, shown in FIG. 8, is to connect a sinker line 74 to the leading eye 56 via a snap 76, where the snap 76 is selected to be of sufficient size that it cannot pass into a hood passage 78 of the resilient hood 60. The snap 76 bears forcibly against a hood leading end 80 and acts to compress the resilient hood 60. The compression of the resilient hood 60 biases the snap 76, and the leading eye 56 which is attached thereto, forward, which also biases the trailing eye 58 forward against the weight trailing end 68 to maintain it engaged therewith (the position shown in FIG. 7). An alternative approach to providing such a bias is discussed below with regard to FIG. 10.

To provide a desired degree of durability and abrasion resistance, the resilient hood 60 should be formed of a material which is not too soft, and to have sufficient thickness to avoid tearing. One material for the resilient hood 60 that has been found effective in providing a desired degree of resiliency while remaining durable in use is natural or synthetic rubber tubing. One type of material which has been found suitable is a rubber tubing such as the tubing employed in vehicles to carry windshield washer fluid from a reservoir to a spray nozzle. When the weight 52 and wire member 54 have the dimensions set forth above for the weight 12 and wire member 14, it has been found effective to employ rubber tubing having an inside diameter of about 3/32" and an outside diameter of about 1/4" when in an unstretched condition. It has been found that resilient hoods with the desired degree of durability and abrasion resistance may be stiff and thus hard to compress longitudinally. To provide greater compressibility, the resilient hood 60 can be provided with a series of cutouts 82. In the embodiment shown, the cutouts 82 are arranged in two opposed rows. The cutouts 82 reduce the amount of material that must be compressed in order to compress the resilient hood 60 against the weight leading end 72 of the weight 52, either to move the leading eye 56 toward the weight leading end 72 and the trailing eye 58 away from the weight trailing end 68, or to expose the leading eye 56 to allow attaching a fastener or the sinker line 74 thereto.

In some cases, particularly when using the linkable sinker 50 by itself, it is convenient to tie the sinker line 74 directly to the leading eye 56, as shown in FIG. 9. When such is done, the wire member 54 is stabilized only by the frictional engagement of the trailing eye leg 62 with the weight passage 66, as illustrated in 7.

When the sinker line 74 is tied directly to the leading eye 56, a line shield can be provided by employing a tube 84 having a tube trailing end 86 that is configured to be inserted into the hood passage 78 of the resilient hood 60 and to become frictionally engaged therein when so inserted. The frictional engagement of the enlarged tube trailing end 86 with the resilient hood 60 serves to secure the tube 84 to the linkable sinker 50, allowing the tube 84 to act as a deflector to help guide and lift the linkable sinker 50 over obstructions to provide further resistance to snagging. Such line shields are discussed further in the co-pending application Ser. No. 11/828,414 of the present inventor entitled "Snag-Resistant Sinker Line Shield".

To positively retain the tube trailing end 86 engaged with the resilient hood 60, the series of cutouts 82 can include a leading pair of cutouts 82' that communicate with the hood passage 78 so as to provide a pair of hood rearward-facing ledges 88 that positively engage the tube trailing end 86. The resilient hood 60 in turn is attached to the weight 52 by forcibly inserting the weight leading end 72, which is tapered, into the hood passage 78 a sufficient distance that the weight leading end 72 becomes frictionally secured therein.

The combination of the linkable sinker 50 and the line shield having the tube 84 has been found particularly effective when employed with a bait locating device which raises a lure above the bottom surface of the water, such as the bait locating device taught in U.S. Pat. No. 5,555,668. In some cases when this combination has been employed with such a bait locating device, several lures have been lost due to snagging, despite being raised above the bottom of the body of water, but no sinkers were snagged while being dragged directly over the bottom.

FIG. 10 illustrates a linkable sinker 100 that employs an alternative approach to biasing a trailing eye 102 of a wire member 104 into engagement with a weight trailing end 106 of a weight 108 and attaching a resilient hood 110 with respect to the weight 108. In this embodiment, the resilient hood 110 has a hood passage 112 having a hood passage leading portion 114 and a hood passage trailing portion 116, with a forward-facing ledge 118 formed at the junction of the hood passage leading portion 114 and the hood passage trailing portion 116, as better shown in FIG. 11. The hood passage trailing portion 116 is sized such that a leading eye 120 of the wire member 104 cannot readily pass into the hood passage trailing portion 116. In contrast, the hood passage leading portion 114 is sized sufficiently to allow the leading eye 120 to pass therethrough, so as to enable the leading eye 120 to be extended from the resilient hood 110 to allow attaching a fastener or a sinker line to the leading eye 120 when the resilient hood 110 is longitudinally compressed. To provide a bias to the trailing eye 102, the forward-facing ledge 118 is spaced apart from a hood trailing end 122 by an unconstrained distance d that is selected relative to a weight length $L_W$ and an eye separation S such that $d>S-L_W$. Since the distance d is greater than the difference between the weight length $L_W$ and the eye separation S, the engagement of the leading eye 120 with the forward-facing ledge 118 acts to compress a trailing portion 124 of the resilient hood 110 against a weight leading end 126 of the weight 108. This compression acts to bias the leading eye 120 forward and thus biases the trailing eye 102 against the weight trailing end 106. The engagement of the leading eye 120 with the forward-facing ledge 118 also serves to attach the resilient hood 110 with respect to the weight leading end 126 in this embodiment.

FIG. 12 is a partial section view that illustrates a linkable sinker 150 that forms another embodiment of the present invention, which has a resilient hood 152 that is formed from a length of corrugated tubing, having corrugations 154 that allow the resilient hood 152 to be readily compressed. The corrugations 154 also provide a series of rearward-facing ledges 156, which could be employed to engage an enlarged tube trailing end of tube such as the tube 84 shown in FIG. 9 to secure the tube with respect to a weight 158 of the sinker 150 and provide a line shield to guide and lift the sinker 150 over obstructions.

While the novel features of the present invention have been described in terms of particular embodiments and preferred applications, it should be appreciated by one skilled in the art that substitution of materials and modification of details obviously can be made without departing from the spirit of the invention.

What I claim is:

1. A linkable sinker comprising:
   an elongated weight having a weight length $L_W$ and having a weight passage therethrough;
      a wire member having a shank portion that passes through said weight passage and terminating at a leading eye and a trailing eye, said leading and trailing eyes being sized so as to be blocked from passing into said weight passage,
      said trailing eye being formed by an open-ended loop having a trailing eye leg that can be positioned to extend parallel to said shank portion and, when so positioned, can be inserted into said weight passage to close said trailing eye, said trailing eye leg having a trailing eye leg length $L_L$,
      said leading eye and said trailing eye being separated by an eye separation S selected such that $S>L_W+L_L$, whereby, when said wire member is slid in said weight passage to bring said leading eye toward a weight leading end of said elongated weight, said trailing eye leg is removed from said weight passage to allow access to said trailing eye; and
   a resilient hood attaching to said weight leading end at a trailing end of said resilient hood such that said weight leading end is positioned inside said resilient hood, said resilient hood having a hood passage configured such that said leading eye of said wire member can movably reside therein, said resilient hood having an uncompressed hood length $L_H$ such that $L_H+L_W>S$, whereby said resilient hood extends over said leading eye and a portion of said shank portion that extends from said weight leading end when said hood is in an uncompressed state and said trailing eye is inserted into said weight passage, said resilient hood extending over said leading eye such that the leading eye is positioned inside said hood passage and below a leading end of said resilient hood which is opposite said trailing end of said resilient hood,
   said resilient hood being compressible against said weight leading end so as to allow said leading eye to be extended from said hood passage for access.

2. The linkable sinker of claim 1 wherein said open-ended loop of said trailing eye, when said trailing eye leg is removed from said weight passage, has an access gap G, and
   further wherein said leading eye is formed of wire having a wire diameter D that is sized such that D>G.

3. The linkable sinker of claim 1 further comprising:
   means for maintaining said trailing eye engaged with a trailing end of said elongated weight.

4. The linkable sinker of claim 3 wherein said means for maintaining said trailing eye engaged with said trailing end of said elongated weight is provided by forming said trailing eye such that it is elastically deformed to position said trailing eye leg parallel to said shank portion of said wire member,
   whereby said trailing eye leg forcibly engages said weight passage when inserted therein.

5. The linkable sinker of claim 4 wherein said elongated weight further comprises:
   a sleeve of abrasion-resistant material adjacent said weight trailing end and forming a portion of said weight passage which is engaged by said trailing eye leg.

6. The linkable sinker of claim 3 wherein the linkable sinker is connected to a fishing line by a snap removably attached to said leading eye,
   further wherein said means for maintaining said trailing eye engaged with said trailing end of said elongated weight is provided by sizing said hood passage sufficiently small that the snap cannot pass into said hood passage, whereby the snap compresses said resilient hood when attached to said leading eye.

7. The linkable sinker of claim 3 wherein said means for maintaining said trailing eye engaged with said trailing end of said elongated weight further comprises:
   a forward-facing ledge formed in said hood passage, said forward-facing ledge being configured to forcibly engage said leading eye so as to place a hood trailing portion of said resilient hood in compression.

8. The linkable sinker of claim 3 wherein said elongated weight is substantially cylindrical and said weight leading end is tapered, and
   further wherein said hood leading end is tapered.

9. The linkable sinker of claim 8 wherein said hood passage is configured such that said tapered weight leading end can be forcibly inserted therein and becomes frictionally engaged therein so as to attach said resilient hood to said weight leading end.

10. The linkable sinker of claim 9 wherein said resilient hood further comprises:
    a series of cutouts extending through the hood so as to communicate with said hood passage.

11. The linkable sinker of claim 10 further comprising:
    at least one rearward-facing ledge formed by said series of cutouts.

12. A linkable sinker comprising:
    an elongated weight having a weight length $L_W$ and having a weight passage therethrough;
       a wire member having a shank portion that passes through said weight passage and terminating at a leading eye and a trailing eye, said leading eye and trailing eyes being sized so as to be blocked from passing into said weight passage, said trailing eye being formed by an open-ended loop having a trailing eye leg that can be positioned to extend parallel to said shank portion, and when so positioned, can be inserted into said weight passage to close said trailing eye, said trailing eye leg having a trailing eye leg length $L_L$, said trailing eye leg crossing over said shank portion of said wire member so as to form a coil spring-like structure, said leading eye and said trailing eye being separated by an eye separation S selected such that $S > L_W + L_L$, whereby, when said wire member is slid in said weight passage to bring said leading eye toward a weight leading end of said elongated weight, said trailing eye leg is removed from said weight passage to allow access to said trailing eye, said open-ended loop of said trailing eye, when said trailing eye leg is removed from said weight passage, having an access gap G, said leading eye being formed of wire having a wire diameter D that is sized such that $D > G$.

13. An articulated sinker comprising:

a first elongated weight having a first weight passage therethrough;

a first wire member passing through said first weight passage and terminating at a first leading eye and a first trailing eye, said first leading eye and said first trailing eye being sized so as to be blocked from passing into said first weight passage, said first trailing eye being openable to allow access to said first trailing eye;

a second elongated weight having a second weight passage therethrough;

a second wire member passing through said second weight passage and terminating at a second leading eye and a second trailing eye, said second leading eye and said second trailing eye being sized so as to be blocked from passing into said second weight passage, said second leading eye being linked to said first trailing eye; and a resilient hood residing over a portion of said second wire member including said second leading eye and extending between said first elongated weight and said second elongated weight.

14. The articulated sinker of claim 13 further comprising:

means for maintaining said first trailing eye engaged with a first weight trailing end of said first elongated weight.

15. The articulated sinker of claim 14 wherein said first trailing eye is formed by an open-ended loop that terminates at a shank portion of said first wire member and a first trailing eye leg that can be positioned to extend parallel to said shank portion so as to be insertable into said first weight passage, said first trailing eye being openable by sliding said first wire member so as to move said first leading eye toward a first weight leading end of said first elongated weight and moving said first trailing eye away from said first trailing end to remove said first trailing eye leg from said first weight passage.

16. The articulated sinker of claim 15 wherein said means for maintaining said first trailing eye engaged with said first weight trailing end is provided by forming said first trailing eye such that it is elastically deformed to position said first trailing eye leg parallel to said shank portion of said first wire member, whereby said first trailing eye leg forcibly engages said first weight passage when inserted therein.

17. The articulated sinker of claim 13 wherein said first trailing eye has an access gap G when opened, further wherein said second leading eye is formed of wire having a wire diameter D that is sized such that $D > G$.

18. The articulated sinker of claim 13 further comprising:

a first weight resilient hood extending over a portion of said first wire member adjacent said first leading eye.

* * * * *